United States Patent
Lv et al.

(10) Patent No.: US 10,117,233 B2
(45) Date of Patent: Oct. 30, 2018

(54) METHOD FOR DOWNLINK CONTROL INFORMATION TRANSMISSION, BASE STATION AND TERMINAL

(71) Applicant: Huawei Technologies Co., Ltd., Shenzhen (CN)

(72) Inventors: Yongxia Lv, Shenzhen (CN); Brian Classon, Shenzhen (CN); Wen Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 193 days.

(21) Appl. No.: 14/581,192

(22) Filed: Dec. 23, 2014

(65) Prior Publication Data

US 2015/0110055 A1 Apr. 23, 2015

Related U.S. Application Data

(63) Continuation of application No. PCT/CN2012/078000, filed on Jun. 30, 2012.

(51) Int. Cl.
*H04W 72/04* (2009.01)
*H04W 48/12* (2009.01)
*H04W 72/12* (2009.01)

(52) U.S. Cl.
CPC ......... *H04W 72/042* (2013.01); *H04W 48/12* (2013.01); *H04W 72/1289* (2013.01)

(58) Field of Classification Search
CPC ... H04W 4/005–4/006; H04W 72/042; H04W 72/048; H04W 72/12–72/121; H04W 72/1289–72/1294
See application file for complete search history.

(56) References Cited

U.S. PATENT DOCUMENTS

| | | |
|---|---|---|
| 2011/0038275 A1 | 2/2011 | Kim et al. |
| 2011/0255499 A1 | 10/2011 | Kim et al. |
| 2012/0113920 A1 | 5/2012 | Cheng et al. |

FOREIGN PATENT DOCUMENTS

| | | |
|---|---|---|
| CN | 101123472 A | 2/2008 |
| CN | 101505498 A | 8/2009 |

(Continued)

OTHER PUBLICATIONS

LG Electronics, "On the Common Search Space for E-PDCCH-configured UEs," 3GPP TSG RAN WG1 Meeting #68, Dresden, German, R1-120451, 2012, 4 pages.

(Continued)

*Primary Examiner* — Eric Myers
(74) *Attorney, Agent, or Firm* — Brinks Gilson & Lione

(57) ABSTRACT

Embodiments of the present application provided a method for downlink control information transmission, a base station and a terminal. In one aspect, by acquiring subframe configuration information of a terminal, where the subframe configuration information is used for indicating a first subframe for transmitting common control information and a second subframe for transmitting dedicated control information, the embodiments of the present application enable the common control information to be transmitted to the terminal over the first subframe and/or enable the dedicated control information to be transmitted to the terminal over the second subframe according to the subframe configuration information, thereby achieving downlink control information transmission between the base station and the terminal.

8 Claims, 6 Drawing Sheets

(56) References Cited

FOREIGN PATENT DOCUMENTS

| | | |
|---|---|---|
| CN | 101790241 A | 7/2010 |
| CN | 102123432 A | 7/2011 |
| CN | 102123524 A | 7/2011 |
| CN | 102195742 A | 9/2011 |
| EP | 2 302 830 A2 | 3/2011 |

OTHER PUBLICATIONS

Research in Motion, UK Limited, "Design Consideration for E-PDCCH," 3GPP TSG RAN WG1 Meeting #66, Athens, Greece, R1-112373, 2011, 6 pages.

METHOD FOR DOWNLINK CONTROL INFORMATION TRANSMISSION, BASE STATION AND TERMINAL

CROSS-REFERENCE TO RELATED APPLICATIONS

This application is a continuation of International Application No. PCT/CN2012/078000, filed on Jun. 30, 2012, which is hereby incorporated by reference in its entirety.

TECHNICAL FIELD

The present application relates to communication technologies and, in particular, to a method for downlink control information transmission, a base station and a terminal.

BACKGROUND

In wireless communication systems such as a long term evolution (LTE) system and a long term evolution advanced (LTE-A) system, when supporting a machine type communications (MTC) application with a large number of terminals, in order to reduce the cost of a terminal (i.e. an MTC terminal), i.e. an MTC terminal may be a low cost terminal, it can be specified that the MTC terminal can perform signaling or data processing only within a part of bandwidth in a system bandwidth.

However, how a base station and an MTC terminal transmit downlink control information is not provided in the prior art.

SUMMARY

Aspects of the present application provide a method for downlink control information transmission, a base station and a terminal, which are used for achieving downlink control information transmission between the base station and an MTC terminal.

An aspect of the present application provides a method for downlink control information transmission, including:

acquiring subframe configuration information of a terminal, where the subframe configuration information is used for indicating a first subframe for transmitting common control information and a second subframe for transmitting dedicated control information;

transmitting the common control information to the terminal over the first subframe, and/or transmitting the dedicated control information to the terminal over the second subframe, according to the subframe configuration information.

Another aspect of the present application provides a method for downlink control information transmission, including:

acquiring subframe configuration information of a terminal, where the subframe configuration information is used for indicating a first subframe for transmitting common control information and a second subframe for transmitting dedicated control information;

blindly detecting and receiving the common control information transmitted by a base station over the first subframe, and/or blindly detecting and receiving the dedicated control information transmitted by the base station over the second subframe, according to the subframe configuration information.

Another aspect of the present application provides a method for downlink control information transmission, including:

acquiring subframe configuration information of a terminal, where the subframe configuration information is used for indicating a first subframe for transmitting dedicated control information of the terminal and a second subframe for transmitting control information of a group to which the terminal belongs;

transmitting to the terminal the dedicated control information of the terminal over the first subframe, and/or transmitting to the terminal the control information of the group over the second subframe, according to the subframe configuration information.

Another aspect of the present application provides a method for downlink control information transmission, including:

acquiring subframe configuration information of a terminal, where the subframe configuration information is used for indicating a first subframe for transmitting dedicated control information of the terminal and a second subframe for transmitting control information of a group to which the terminal belongs;

blindly detecting and receiving dedicated control information of the terminal transmitted by a base station over the first subframe, and/or blindly detecting and receiving control information of the group transmitted by the base station over the second subframe, according to the subframe configuration information.

Another aspect of the present application provides a base station, including:

an acquiring unit, configured to acquire subframe configuration information of a terminal, where the subframe configuration information is used for indicating a first subframe for transmitting common control information and a second subframe for transmitting dedicated control information;

a transmitter, configured to, according to the subframe configuration information, transmit the common control information to the terminal over the first subframe, and/or transmit the dedicated control information to the terminal over the second subframe.

Another aspect of the present application provides a terminal, including:

an acquiring unit, configured to acquire subframe configuration information of a terminal, where the subframe configuration information is used for indicating a first subframe for transmitting common control information and a second subframe for transmitting dedicated control information;

a receiver, configured to, according to the subframe configuration information, blindly detect and receive the common control information transmitted by a base station over the first subframe, and/or blindly detect and receive the dedicated control information transmitted by the base station over the second subframe.

Another aspect of the present application provides a base station, including:

an acquiring unit, configured to acquire subframe configuration information of a terminal, where the subframe configuration information is used for indicating a first subframe for transmitting dedicated control information of the terminal and a second subframe for transmitting control information of a group to which the terminal belongs;

a transmitter, configured to, according to the subframe configuration information, transmit to the terminal the dedicated control information of the terminal over the first subframe, and/or transmit to the terminal the control information of the group over the second subframe.

Another aspect of the present application provides a terminal, including:

an acquiring unit, configured to acquire subframe configuration information of a terminal, where the subframe configuration information is used for indicating a first subframe for transmitting dedicated control information of the terminal and a second subframe for transmitting control information of a group to which the terminal belongs;

a receiver, configured to, according to the subframe configuration information, blindly detect and receive dedicated control information of the terminal transmitted by a base station over the first subframe, and/or blindly detect and receive control information of the group transmitted by the base station over the second subframe.

It can be known from the foregoing technical solutions, in one aspect, by acquiring subframe configuration information of a terminal, where the subframe configuration information is used for indicating a first subframe for transmitting common control information and a second subframe for transmitting dedicated control information, embodiments of the present application enable the common control information to be transmitted to the terminal over the first subframe and/or enable the dedicated control information to be transmitted to the terminal over the second subframe according to the subframe configuration information, thereby achieving downlink control information transmission between a base station and a terminal.

It can be known from the foregoing technical solutions, in another aspect, by acquiring subframe configuration information of a terminal, where the subframe configuration information is used for indicating a first subframe for transmitting dedicated control information of the terminal and a second subframe for transmitting control information of a group to which the terminal belongs, embodiments of the present application enable the dedicated control information of the terminal to be transmitted to the terminal over the first subframe and/or enable the control information of the group to be transmitted to the terminal over the second subframe according to the subframe configuration information, thereby achieving downlink control information transmission between a base station and a terminal.

BRIEF DESCRIPTION OF DRAWINGS

In order to make technical solutions in embodiments of the present application more clearly, accompanying drawings used in the description of embodiments are briefly described hereunder. Obviously, the described drawings are merely some embodiments of the present application. For persons skilled in the art, other drawings may be obtained based on these drawings without any inventive efforts.

DESCRIPTION OF EMBODIMENTS

In order to make objectives, technical solutions, and advantages of embodiments of the present application more clearly, the technical solutions in embodiments of the present application are hereinafter described clearly and completely with reference to the accompanying drawings in embodiments of the present application. Obviously, the described embodiments are only a part of embodiments of the present application, rather than all embodiments. All the other embodiments obtained by persons of ordinary skill in the art based on embodiments of the present application without any inventive efforts shall fall within the protection scope of the present application.

Technical solutions of the present application may be applied in various communication systems, e.g., the global system for mobile communication (briefly as GSM), the general packet radio service (briefly as GPRS) system, the code division multiple access (briefly as CDMA) system, the CDMA2000 system, the wideband code division multiple access (briefly as WCDMA) system, the long term evolution (briefly as LTE) system or the world interoperability for microwave access (briefly as WiMAX) system, etc.

The base station is a network element which may be a base station (briefly as BTS) in the GSM system, GPRS system or CDMA system, and may be a base station (NodeB) in the WCDMA system, and may also be an evolutional Node B (briefly as eNB or eNodeB) in the LTE system, and may also be an access service network base station (briefly as ASN BS) in the WiMAX network.

Figure 1:
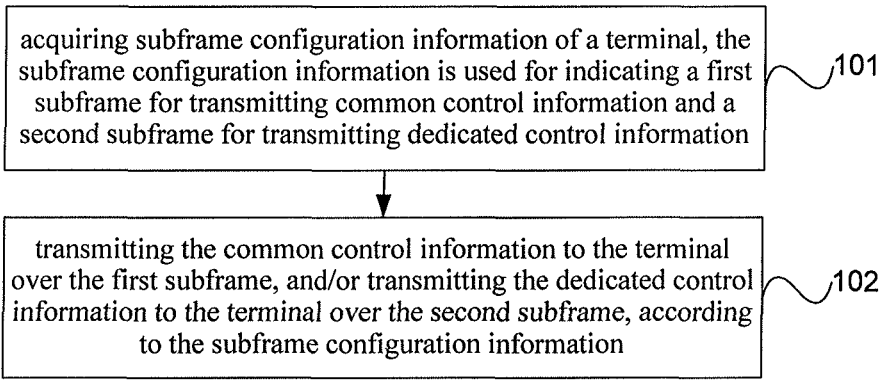
FIG. 1 is a schematic flow chart of a method for downlink control information transmission according to an embodiment of the present application.

FIG. 1 is a schematic flow chart of a method for downlink control information transmission according to an embodiment of the present application, as shown in FIG. 1.

101, acquiring subframe configuration information of a terminal, the subframe configuration information is used for indicating a first subframe for transmitting common control information and a second subframe for transmitting dedicated control information.

102, transmitting the common control information to the terminal over the first subframe, and/or transmitting the dedicated control information to the terminal over the second subframe, according to the subframe configuration information.

It should be noted, an executive agent for 101 and 102 described above may be a base station.

Alternatively, in a possible implementation of this embodiment, the first subframe may not be overlapped with the second subframe.

Taking the LTE system as an example, two types of search space are defined for UE's blind detection: a common search space and a UE specific search space. The UE specific search space includes physical downlink control channel (PDCCH) formats 0, 1, 2 and 3, and the common search space only includes PDCCH formats 2 and 3. The common search space (CSS) usually transmits some common control information, such as paging, random access response, system broadcast and power control, cyclic redundancy check (CRC) of the common control information is generally scrambled by a paging-radio network temporary identity (P-RNTI), a random access-radid network temporary identity (RA-RNTI), a system information radio network temporary identity (SI-RNTI) or a transmit power control radio network temporary identity (TPC-RNTI) and so on, respectively, the common control information is not limited to the above, and may also be expanded during an evolutional process of protocol version; the UE specific search space (USS) generally transmits some dedicated control information of a UE, such as uplink scheduling information and downlink scheduling information, the CRC of the dedicated control information is scrambled generally by a cell radio network temporary identity (C-RNTI) or a semi-persistent scheduling (SPS) C-RNTI and so on. That is to say, in this embodiment, a base station transmits the common control information over the first subframe, and transmits the dedicated control information over the second subframe; correspondingly, a terminal blindly detects the common search space over the first subframe, and blindly detects the specific search space over the second subframe.

Since the subframes occupied by the transmission of the common control information and by the transmission of the dedicated control information are different subframes, thus, as for an MTC terminal, it can be achieved that the MTC terminal can correctly receive the common control information or the dedicated control information transmitted over each subframe.

Alternatively, in a possible implementation of this embodiment, after the acquiring the subframe configuration information of the terminal, the base station may further transmit subframe information to the terminal, where the subframe information is used for indicating the first subframe for transmitting common control information and/or the second subframe for transmitting dedicated control information, so that the terminal determines the first subframe for transmitting the common control information and the second subframe for transmitting the dedicated control information according to the subframe information.

Specifically, the base station may transmit the subframe information to the terminal through a high layer signaling or a system broadcast message specifically.

For example, the high layer signaling may be a radio resource control (RRC) message, and may carry the subframe information via an information element (IE) in the RRC message specifically, the RRC message may be an RRC message in the prior art, such as an RRC connection reconfiguration (RRC CONNECTION RECONFIGURATION) message, this embodiment will not make a limitation thereto, the subframe information is carried by expanding an IE of an existing RRC message, or the RRC message may also be an RRC message different from the existing one in the prior art.

For another example, the high layer signaling may be a media access control (MAC) control element (CE) message, and may also carry the subframe information by adding a new MAC CE message specifically.

For another example, the subframe information may be carried by using a spare bit (bit) in an existing master information block (MIB) or system information block (SIB) in the system broadcast message specifically, or the subframe information may also be carried by adding a new SIB.

It may be understood, a high layer signaling or a system broadcast message involved in embodiments hereafter may use the above described ways for understanding.

Alternatively, the base station may also transmit the subframe information to the terminal not through a high layer signaling or a system broadcast message, the terminal may also obtain the subframe information according to predetermined configuration, such as an agreement.

Alternatively, in a possible implementation of this embodiment, after determining the subframe configuration information according to the first subframe and the second subframe, the base station may further transmit indication information to the terminal, so that the terminal determines the second subframe according to the indication information and the first subframe indicated by the subframe information; or, so that the terminal determines the first subframe according to the indication information and the second subframe indicated by the subframe information.

Specifically, the base station may transmit the indication information to the terminal through a high layer signaling or a system broadcast message specifically.

Alternatively, the base station may also transmit the indication information to the terminal not through the high layer signaling or the system broadcast message, the terminal may also obtain the indication information according to predetermined configuration, such as an agreement.

Alternatively, in a possible implementation of this embodiment, the first subframe may also be overlapped with the second subframe. Specifically, the base station may determine that the overlapped subframe is the first subframe for transmitting common control information or the second subframe for transmitting dedicated control information according to the subframe information and priority information specifically. For example, the base station may notice a period for transmitting common control information and/or a period for transmitting dedicated control information, and the terminal receives the common control information and/or the dedicated control information according to the period. If, within a subframe, according to the period, the common control information conflicts with the dedicated control information, then the base station will perform the determining according to the priority information, for example, if the priority of the common control information is higher than the priority of the dedicated control information, then the base station may determine the subframe as the first subframe for transmitting the common control information. Since transmission of the common control information and/or the dedicated control information is periodic, then, correspondingly, the terminal may perform blind detection and receive the common control information and/or the dedicated control information periodically, which may reduce power consumption of the terminal effectively.

Specifically, the base station may specifically transmit the priority information to the terminal through a high layer signaling or a system broadcast message.

Alternatively, the base station may also transmit the priority information to the terminal not through a high layer signaling or a system broadcast message, the terminal may also obtain the priority information according to predetermined configuration, such as an agreement.

In an MTC application with a large number of terminals, a plurality of MTC terminals may be grouped into a group to be scheduled. The concept of the group is not limited to such an expression as group, and may also be replaced by a similar expression, such as a bunch, a cluster and a category. The base station may schedule a terminal or a plurality of terminals in a group through control information for downlink data group scheduling, a CRC of the control information for downlink data group scheduling is scrambled by a group-based RNTI, the group identity is written as a Group-RNTI in this embodiment, and is not limited to being written as the Group-RNTI in practical application. If a type of search space is defined for a group to which a terminal belongs, it may be referred to as a search space of the group to which the terminal belongs in the present application, then, in each subframe, the terminal needs to perform blind detection in the search space of the group to which the terminal belongs and a specific search space of the terminal, respectively, thus the blind detection times of the terminal will be increased, and may exceed the maximum tolerable blind detection times in an existing standard. Therefore, in a possible implementation of this embodiment, the second sbuframe for transmitting the dedicated control information indicated by the subframe configuration information acquired by the base station may include:

a third subframe for transmitting dedicated control information of the terminal; and/or a fourth subframe for transmitting control information of a group to which the terminal belongs.

That is to say, the second subframe may be composed of the third subframe and the fourth subframe.

Alternatively, in a possible implementation of this embodiment, the third subframe may not be overlapped with the fourth subframe.

Alternatively, in a possible implementation of this embodiment, the third subframe may also be overlapped with the fourth subframe, the base station specifically determines that the overlapped subframe is the third subframe for transmitting the dedicated control information of the terminal or the fourth subframe for transmitting the control information of the group to which the terminal belongs, reference may be made to related contents where the first subframe is overlapped with the second subframe for detailed descriptions, and will not be repeated herein.

Correspondingly, the base station may specifically determine the third subframe for transmitting the dedicated control information of the terminal and the fourth subframe for transmitting the control information of the group to which the terminal belongs according to the subframe information, the specific determining method is similar to the method for determining the first subframe and the second subframe, reference may be made to related contents, and will not be repeated herein.

Correspondingly, in 102, the base station may specifically transmit to the terminal the dedicated control information of the terminal over the third subframe; and/or transmit to the terminal the control information of the group to which the terminal belongs over the fourth subframe.

Since the subframes occupied by the transmission of the dedicated control information of the terminal and by the transmission of the control information of the group to which the terminal belongs are different subframes, as for the terminal, the terminal only needs to perform blind detection in a search space of a group to which the terminal belongs or a specific search space of the terminal in each subframe, thus the blind detection times of the UE will not be increased, therefore, the times of blind detection performed by the terminal in each subframe can meet the maximum tolerable blind detection times in an existing standard.

In this embodiment, by acquiring subframe configuration information of a terminal, where the subframe configuration information is used for indicating a first subframe for transmitting common control information and a second subframe for transmitting dedicated control information, the common control information can be transmitted to the terminal over the first subframe and/or the dedicated control information can be transmitted to the terminal over the second subframe according to the subframe configuration information, thereby achieving downlink control information transmission between a base station and a terminal.

Additionally, since the subframes occupied by a common search space for transmitting common control information and a UE-specific search space for transmitting dedicated control information are different subframes, thus, as for an MTC terminal, it can be achieved that the MTC terminal can correctly receive the common control information or the dedicated control information transmitted over each subframe.

Figure 2:
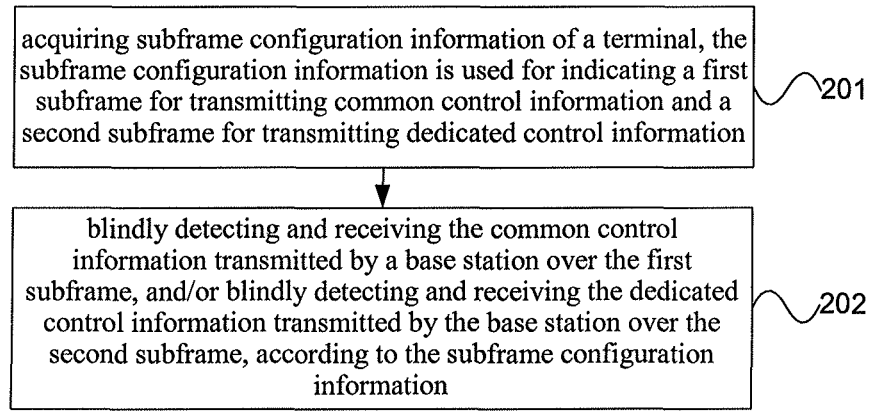
FIG. 2 is a schematic flow chart of a method for downlink control information transmission according to another embodiment of the present application.

FIG. 2 is a schematic flow chart of a method for downlink control information transmission according to another embodiment of the present application, as shown in FIG. 2.

201, acquiring subframe configuration information of a terminal, the subframe configuration information is used for indicating a first subframe for transmitting common control information and a second subframe for transmitting dedicated control information.

202, blindly detecting and receiving the common control information transmitted by a base station over the first subframe, and/or blindly detecting and receiving the dedicated control information transmitted by the base station over the second subframe, according to the subframe configuration information.

Alternatively, in a possible implementation of this embodiment, before 201, the method further includes: acquiring subframe information of the terminal, where the subframe information is used for indicating the first subframe for transmitting the common control information and/or the second subframe for transmitting the dedicated control information; and then, determining the first subframe for transmitting the common control information and the second subframe for transmitting the dedicated control information according to the subframe information, and determining the subframe configuration information according to the first subframe and the second subframe.

It should be noted, an executive agent for 201 and 202 described above may be a terminal.

Alternatively, in a possible implementation of this embodiment, the first subframe is not overlapped with the second subframe.

Since the subframes occupied by the transmission of common control information and for the transmission of dedicated control information are different subframes, thus, as for an MTC terminal, it may be achieved that the MTC terminal may correctly receive the common control information or the dedicated control information transmitted over each subframe.

Alternatively, in a possible implementation of this embodiment, a terminal may specifically receive the subframe information transmitted by the base station.

Specifically, the terminal may specifically receive the subframe information transmitted by the base station through a high layer signaling or a system broadcast message.

For example, the high layer signaling may be a radio resource control (RRC) message, and may carry the subframe information via an information element (IE) in the RRC message specifically, the RRC message may be an RRC message in the prior art, such as an RRC connection reconfiguration (RRC CONNECTION RECONFIGURATION) message, this embodiment will not make a limitation thereto, the subframe information is carried by expanding an IE of an existing RRC message, or the RRC message may also be an RRC message different from the existing one in the prior art.

For another example, the high layer signaling may be a media access control (MAC) control element (CE) message, and may also carry the subframe information by adding a new MAC CE message specifically.

For another example, the subframe information may be carried by using a spare bit (bit) in an existing master information block (MIB) or system information block (SIB) in the system broadcast message specifically, or the subframe information may also be carried by adding a new SIB.

It can be understood, a high layer signaling or a system broadcast message involved in embodiments hereafter may use the above described ways for understanding.

Alternatively, the base station may also transmit the subframe information to the terminal not through a high layer signaling or a system broadcast message; the terminal may also obtain the subframe information according to predetermined configuration, such as an agreement.

Alternatively, in a possible implementation of this embodiment, if the subframe information acquired by the terminal indicates the first subframe for transmitting the common control information, then, the terminal may further acquire indication information; correspondingly, the terminal may further determine the second subframe for transmitting the dedicated control information according to the indication information and the first subframe indicated by the subframe information. For example, the indication information may indicate that the terminal determines other subframes except the first subframe as the second subframes, assuming that the first subframes are subframes numbered 2 and 6, then, the second subframes are subframes numbered 0, 1, 3, 4, 5, 7, 8 and 9; or, the indication information may indicate that the terminal determines a part of subframes in other subframes except the first subframe as the second subframe, assuming that the first subframes are subframes numbered 2 and 6 and a part of subframes indicated by the indication information are subframes with the first three number, then, the second subframes are subframes numbered 0, 1 and 3, this embodiment will not make a limitation thereto.

Alternatively, in a possible implementation of this embodiment, if the subframe information acquired by the terminal indicates the second subframe for transmitting the common control information, then, the terminal may further acquire indication information; correspondingly, the terminal may further determine the first subframe for transmitting the common control information according to the indication information and the second subframe indicated by the subframe information. For example, the indication information may indicate that the terminal determines other subframes except the second subframe as the first subframe; or, the indication information may indicate that the terminal determines a part of subframes in other subframes except the second subframe as the first subframe, this embodiment will not make a limitation thereto.

Specifically, a way that the terminal acquires indication information may be the following:

the terminal receives the indication information transmitted by the base station through a high layer signaling or a system broadcast message; or the base station may also transmit the indication information to the terminal not through a high layer signaling or a system broadcast message, the terminal may also obtain the indication information according to predetermined configuration, such as an agreement.

Alternatively, in a possible implementation of this embodiment, the first subframe may also be overlapped with the second subframe. Specifically, the terminal may specifically determine that the overlapped subframe is the first subframe for transmitting common control information or the second subframe for transmitting dedicated control information according to the subframe information and priority information. For example, the base station may notice a period for transmitting common control information and/or a period for transmitting dedicated control information, and the terminal receives the common control information and/or the dedicated control information according to the period. If, within a subframe, according to the period, the common control information conflicts with the dedicated control information, then the terminal will perform the determining according to the priority information, for example, if the priority of the common control information is higher than the priority of the dedicated control information, then the terminal may determine the subframe as the first subframe for transmitting the common control information. Since transmission of the common control information and/or the dedicated control information is periodic, then correspondingly, the terminal may perform blind detection and receive the common control information and/or the dedicated control information periodically, which may reduce power consumption of the terminal effectively.

Specifically, the terminal may specifically receive the priority information transmitted by the base station through a high layer signaling or a system broadcast message.

Alternatively, the base station may also transmit the priority information to the terminal not through a high layer signaling or a system broadcast message, the terminal may also obtain the priority information according to predetermined configuration, such as an agreement.

In an MTC application with a large number of terminals, a plurality of MTC terminals may be grouped into a group to be scheduled. The concept of the group is not limited to such an expression as group, and may also be replaced by a similar expression, such as a bunch, a cluster and a category. The base station may schedule a terminal or a plurality of terminals in a group through control information for downlink data group scheduling, a CRC of the control information for downlink data group scheduling is scrambled by a group-based RNTI, the group identity is written as a Group-RNTI in this embodiment, and is not limited to being written as the Group-RNTI in practical application. If a type of search space is defined for a group to which a terminal belongs, it may be referred to as a search space of the group to which the terminal belongs in the present application, then, in each subframe, the terminal needs to perform blind detection in the search space of the group to which the terminal belongs and a specific search space of the terminal, respectively, thus blind detection times of the terminal will be increased, and may exceed the maximum tolerable blind detection times in an existing standard. Therefore, in a possible implementation of this embodiment, the second sbuframe for transmitting the dedicated control information indicated by the subframe configuration information acquired by the terminal may include:

a third subframe for transmitting dedicated control information of the terminal; and/or a fourth subframe for transmitting control information of a group to which the terminal belongs.

That is to say, the second subframe may be composed of the third subframe and the fourth subframe.

Alternatively, in a possible implementation of this embodiment, the third subframe may not be overlapped with the fourth subframe.

Alternatively, in a possible implementation of this embodiment, the third subframe may also be overlapped with the fourth subframe, the terminal specifically determines that the overlapped subframe is the third subframe for transmitting the dedicated control information of the terminal or the fourth subframe for transmitting the control information of the group to which the terminal belongs, reference may be made to related contents where the first subframe is overlapped with the second subframe for detailed descriptions, and will not be repeated herein.

Correspondingly, the terminal may specifically determine the third subframe for transmitting the dedicated control information of the terminal and the fourth subframe for transmitting the control information of the group to which the terminal belongs according to the subframe information, the specific determining method is similar to the method for determining the first subframe and the second subframe, reference may be made to related contents, and will not be repeated herein.

Correspondingly, in 202, specifically, the terminal may blindly detect and receive the dedicated control information of the terminal transmitted by the base station over the third subframe; and/or blindly detect and receive the control information of the group to which the terminal belongs transmitted by the base station over the fourth subframe.

Since the subframes occupied by the transmission of the dedicated control information of the terminal and by the transmission of the control information of the group to which the terminal belongs are different subframes, as for a terminal, the terminal only needs to perform blind detection in a search space of a group to which the terminal belongs or a specific search space of the terminal in each subframe, thus the blind detection times of the UE will not be increased, therefore, the times of blind detection performed by the terminal in each subframe can meet the maximum tolerable blind detection times in the existing standard.

In this embodiment, by acquiring subframe configuration information of a terminal, where the subframe configuration information is used for indicating a first subframe for transmitting common control information and a second subframe for transmitting dedicated control information, the common control information transmitted by a base station can be blindly detected and received over the first subframe and/or the dedicated control information transmitted by the base station can be blindly detected and received over the second subframe according to the subframe configuration information, thereby achieving downlink control information transmission between a base station and a terminal.

Additionally, since the subframes occupied by a common search space for transmitting common control information and a UE-specific search space for transmitting dedicated control information are different subframes, thus, as for an MTC terminal, it can be achieved that the MTC terminal can correctly receive the common control information or the dedicated control information transmitted over each subframe.

Figure 3:
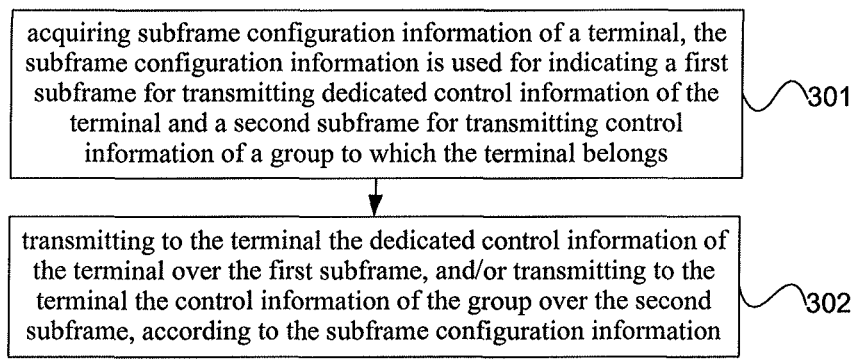
FIG. 3 is a schematic flow chart of a method for downlink control information transmission according to another embodiment of the present application.

FIG. 3 is a schematic flow chart of a method for downlink control information transmission according to another embodiment of the present application, as shown in FIG. 3.

301, acquiring subframe configuration information of a terminal, the subframe configuration information is used for indicating a first subframe for transmitting dedicated control information of the terminal and a second subframe for transmitting control information of a group to which the terminal belongs.

302, transmitting to the terminal the dedicated control information of the terminal over the first subframe, and/or transmitting to the terminal the control information of the group over the second subframe, according to the subframe configuration information.

It should be noted, an executive agent for 301 and 302 described above may be a base station.

Alternatively, in a possible implementation of this embodiment, the first subframe may not be overlapped with the second subframe.

Taking the LTE system as an example, two types of search space are defined for UE's blind detection: a common search space and a UE specific search space. The UE specific search space includes physical downlink control channel (PDCCH) formats 0, 1, 2 and 3, and the common search space only includes PDCCH formats 2 and 3. The UE specific search space (USS) generally transmits some dedicated control information of a UE, such as uplink scheduling information and downlink scheduling information, the CRC of the dedicated control information is scrambled generally by a cell radio network temporary identity (C-RNTI) or a semi-persistent scheduling (SPS) C-RNTI and so on.

In an MTC application with a large number of terminals, a plurality of MTC terminals may be grouped into a group to be scheduled. The concept of the group is not limited to such an expression as group, and may also be replaced by a similar expression, such as a bunch, a cluster and a category. The base station may schedule a terminal or a plurality of terminals in a group through control information for downlink data group scheduling, a CRC of the control information for downlink data group scheduling is scrambled by a group-based RNTI, the group identity is written as a Group-RNTI in this embodiment, and is not limited to being written as the Group-RNTI in practical application. If a type of search space is defined for a group to which a terminal belongs, it may be referred to as a search space of the group to which the terminal belongs in the present application, then, in each subframe, the terminal needs to perform blind detection in the search space of the group to which the terminal belongs and a specific search space of the terminal, respectively, thus the blind detection times of the terminal will be increased, and may exceed the maximum tolerable blind detection times in an existing standard.

That is to say, in this embodiment, the transmission of the dedicated control information of the terminal occupies the first subframe, and the transmission of the control information of the group to which the terminal belongs occupies the second subframe.

Since the subframes occupied by the transmission of the dedicated control information of the terminal and by the transmission of the control information of the group to which the terminal belongs are different subframes, as for the terminal, the terminal only needs to perform blind detection in the search space of the group to which the terminal belongs or the specific search space of the terminal in each subframe, thus the blind detection times of the UE will not be increased, therefore, the times of blind detection performed by the terminal in each subframe can meet the maximum tolerable blind detection times in an existing standard.

Alternatively, in a possible implementation of this embodiment, after acquiring the subframe configuration information of the terminal, the base station may further transmit subframe information to the terminal, where the subframe information is used for indicating the first subframe for transmitting the dedicated control information of the terminal and/or the second subframe for transmitting the control information of the group to which the terminal belongs, so that the terminal determines the first subframe and the second subframe according to the subframe information.

Specifically, the base station may specifically transmit the subframe information to the terminal through a high layer signaling or a system broadcast message.

For example, the high layer signaling may be a radio resource control (RRC) message, and may carry the subframe information via an information element (IE) in the RRC message specifically, the RRC message may be an RRC message in the prior art, such as an RRC connection reconfiguration (RRC CONNECTION RECONFIGURATION) message, this embodiment will not make a limitation thereto, the subframe information is carried by expanding an IE of an existing RRC message, or the RRC message may also be an RRC message different from the existing one in the prior art.

For another example, the high layer signaling may be a media access control (MAC) control element (CE) message, and may also carry the subframe information by adding a new MAC CE message specifically.

For another example, the subframe information may be carried by using a spare bit (bit) in an existing master information block (MIB) or system information block (SIB) in the system broadcast message specifically, or the subframe information may also be carried by adding a new SIB.

It can be understood, a high layer signaling or a system broadcast message involved in embodiments hereafter may use the above described ways for understanding.

Alternatively, the base station may also transmit the subframe information to the terminal not through a high layer signaling or a system broadcast message; the terminal may also obtain the subframe information according to predetermined configuration, such as an agreement.

Alternatively, in a possible implementation of this embodiment, after determining the subframe configuration information according to the first subframe and the second subframe, the base station may further transmit indication information to the terminal, so that the terminal determines the second subframe according to the indication information and the first subframe indicated by the subframe information; or, so that the terminal determines the first subframe according to the indication information and the second subframe indicated by the subframe information.

Specifically, the base station may transmit the indication information to the terminal through a high layer signaling or a system broadcast message specifically.

Alternatively, the base station may also transmit the indication information to the terminal not through the high layer signaling or the system broadcast message; the terminal may also obtain the indication information according to predetermined configuration, such as an agreement.

Alternatively, in a possible implementation of this embodiment, the first subframe may also be overlapped with the second subframe. Specifically, the base station may specifically determine that the overlapped subframe is the first subframe for transmitting the dedicated control information of the terminal or the second subframe for transmitting the control information of the group to which the terminal belongs according to the subframe information and priority information. For example, the base station may notice a period for transmitting dedicated control information of the terminal and/or a period for transmitting control information of the group, and the terminal receives the dedicated control information of the terminal and/or the control information of the group according to the period. If, within a subframe, according to the period, the dedicated control information of the terminal conflicts with the control information of the group, then the base station will perform the determining according to the priority information, for example, if the priority of the dedicated control information of the terminal is higher than the priority of the control information of the group, then the base station may determine the subframe as the first subframe for transmitting the dedicated control information of the terminal. Since transmission of the dedicated control information of the terminal and/or the control information of the group is periodic, then, correspondingly, the terminal may perform blind detection and receive the dedicated control information of the terminal and/or the control information of the group periodically, which may reduce power consumption of the terminal effectively.

Specifically, the base station may specifically transmit the priority information to the terminal through a high layer signaling or a system broadcast message.

Alternatively, the base station may also transmit the priority information to the terminal not through a high layer signaling or a system broadcast message, the terminal may also obtain the priority information according to predetermined configuration, such as an agreement.

In this embodiment, by acquiring subframe configuration information of a terminal, where the subframe configuration information is used for indicating a first subframe for transmitting dedicated control information of the terminal and a second subframe for transmitting control information of a group to which the terminal belongs, the dedicated control information of the terminal can be transmitted to the terminal over the first subframe and/or the control information of the group can be transmitted to the terminal over the second subframe according to the subframe configuration information, thereby achieving downlink control information transmission between a base station and a terminal.

Since the subframes occupied by the transmission of the dedicated control information of the terminal and by the transmission of the control information of the group to which the terminal belongs are different subframes, as for the terminal, the terminal only needs to perform blind detection in the search space of the group to which the terminal belongs or the specific search space of the terminal in each subframe, thus the blind detection times of the UE will not be increased, therefore, the times of blind detection performed by the terminal in each subframe can meet the maximum tolerable blind detection timess in an existing standard.

Figure 4:
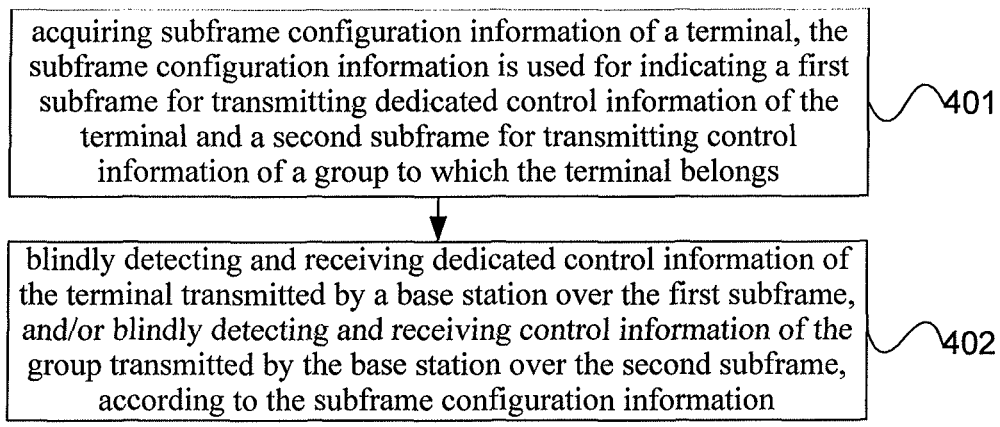
FIG. 4 is a schematic flow chart of a method for downlink control information transmission according to another embodiment of the present application.

FIG. 4 is a schematic flow chart of a method for downlink control information transmission according to another embodiment of the present application, as shown in FIG. 4.

401, acquiring subframe configuration information of a terminal, the subframe configuration information is used for indicating a first subframe for transmitting dedicated control information of the terminal and a second subframe for transmitting control information of a group to which the terminal belongs;

402, blindly detecting and receiving dedicated control information of the terminal transmitted by a base station over the first subframe, and/or blindly detecting and receiving control information of the group transmitted by the base station over the second subframe, according to the subframe configuration information.

Alternatively, in a possible implementation of this embodiment, before 401, the method further includes: acquiring subframe information of the terminal, where the subframe information is used for indicating the first subframe for transmitting the dedicated control information of the terminal and/or the second subframe for transmitting the control information of a group to which the terminal belongs; then, determining the first subframe for transmitting the dedicated control information of the terminal and the second subframe for transmitting the control information of the group according to the subframe information, and determining the subframe configuration information according to the first subframe and the second subframe.

It should be noted, an executive agent for 401 and 402 described above may be a terminal.

Alternatively, in a possible implementation of this embodiment, the first subframe may not be overlapped with the second subframe.

In an MTC application with a large number of terminals, a plurality of MTC terminals may be grouped into a group to be scheduled. The concept of the group is not limited to such an expression way as group, and may also be replaced by a similar expression, such as a bunch, a cluster and a category. The base station may schedule a terminal or a plurality of terminals in a group through control information for downlink data group scheduling, a CRC of the control information for downlink data group scheduling is scrambled by a group-based RNTI, the group identity is written as a Group-RNTI in this embodiment, and is not limited to being written as the Group-RNTI in practical application. If a type of search space is defined for a group to which a terminal belongs, it may be referred to as a search space of the group to which the terminal belongs in the present application, then, in each subframe, the terminal then needs to perform detection in the search space of the group to which the terminal belongs and the specific search space of the terminal, respectively, thus blind detection times of the terminal will be increased, and may exceed the maximum tolerable blind detection times in an existing standard.

That is to say, in this embodiment, the transmission of the dedicated control information of the terminal occupies the first subframe, and the transmission of the control information of the group to which the terminal belongs occupies the second subframe.

Since the subframes occupied by the transmission of the dedicated control information of the terminal and by the transmission of the control information of the group to which the terminal belongs are different subframes, as for the terminal, the terminal only needs to perform blind detection in the search space of the group to which the terminal belongs or the specific search space of the terminal in each subframe, thus the blind detection times of the UE will not be increased, therefore, the times of blind detection performed by the terminal in each subframe can meet the maximum tolerable blind detection times in an existing standard.

Alternatively, in a possible implementation of this embodiment, the terminal may specifically receive the subframe information transmitted by the base station, so that the terminal determines the first subframe and the second subframe according to the subframe information.

Specifically, the terminal may specifically receive the subframe information transmitted by the base station through a high layer signaling or a system broadcast message.

For example, the high layer signaling may be a radio resource control (RRC) message, and may carry the subframe information via an information element (IE) in the RRC message specifically, the RRC message may be an RRC message in the prior art, such as an RRC connection reconfiguration (RRC CONNECTION RECONFIGURATION) message, this embodiment will not make a limitation thereto, the subframe information is carried by expanding an IE of an existing RRC message, or the RRC message may also be an RRC message different from the existing one in the prior art.

For another example, the high layer signaling may be a media access control (MAC) control element (CE) message, and may also carry the subframe information by adding a new MAC CE message specifically.

For another example, the subframe information may be carried by using a spare bit (bit) in an existing master information block (MIB) or system information block (SIB) in the system broadcast message specifically, or the subframe information may also be carried by adding a new SIB.

It can be understood, a high layer signaling or a system broadcast message involved in embodiments hereafter may use the above described ways for understanding.

Alternatively, the base station may also transmit the subframe information to the terminal not through a high layer signaling or a system broadcast message; the terminal may also obtain the subframe information according to predetermined configuration, such as an agreement.

Alternatively, in a possible implementation of this embodiment, if the subframe information acquired by the terminal indicates the first subframe for transmitting the dedicated control information of the terminal, then, the terminal may further acquire indication information; correspondingly, the terminal may further determine the second subframe according to the indication information and the first subframe indicated by the subframe information. For example, the indication information may indicate that the base station determines other subframes except the first subframe as the second subframe, assuming that the first subframes are subframes numbered 2 and 6, then, the second subframes are subframes numbered 0, 1, 3, 4, 5, 7, 8 and 9; or, the indication information may indicate that the base station determines a part of subframes in other subframes except the first subframe as the second subframe, assuming that the first subframes are subframes numbered 2 and 6 and a part of subframes indicated by the indication information are subframes with the first three number, then, the second subframes are subframes numbered 0, 1 and 3, this embodiment will not make a limitation thereto.

Alternatively, in a possible implementation of this embodiment, if the subframe information acquired by the terminal indicates the second subframe for transmitting the control information of the group to which the terminal belongs, then, the terminal may further acquire indication information; correspondingly, the terminal may further determine the first subframe for transmitting the common control information according to the indication information and the second subframe indicated by the subframe information. For example, the indication information may indicate that the base station determines other subframes except the second subframe as the first subframe; or, the indication information may indicate that the base station determines a part of subframes in other subframes except the second subframe as the first subframe, this embodiment will not make a limitation thereto.

Alternatively, in a possible implementation of this embodiment, the terminal may specifically receive the indication information transmitted by the base station, so that the terminal determines the second subframe according to the indication information and the first subframe indicated by the subframe information; or, so that the terminal determines the first subframe according to the indication information and the second subframe indicated by the subframe information.

Specifically, the terminal may specifically receive the indication information transmitted by the base station through a high layer signaling or a system broadcast message.

Alternatively, the base station may also transmit the indication information to the terminal not through a high layer signaling or a system broadcast message; the terminal may also obtain the indication information according to predetermined configuration, such as an agreement.

Alternatively, in a possible implementation of this embodiment, the first subframe may also be overlapped with the second subframe. Specifically, the terminal may specifically determine that the overlapped subframe is the first subframe for transmitting dedicated control information of the terminal or the second subframe for transmitting control information of the group to which the terminal belongs according to the subframe information and priority information. For example, the base station may notice a period for transmitting dedicated control information of the terminal and/or a period for transmitting control information of the group, and the terminal receives the dedicated control information of the terminal and/or the control information of the group according to the period. If, within a subframe, according to the period, the dedicated control information of the terminal conflicts with the control information of the group, then the terminal will perform the determining according to the priority information, for example, if the priority of the dedicated control information of the terminal is higher than the priority of the control information of the group, then the terminal may determine the subframe as the first subframe for transmitting the dedicated control information of the terminal. Since the transmission of the dedicated control information of the terminal and/or the control information of the group is periodic, then, correspondingly, the terminal may then perform blind detection and receive the dedicated control information of the terminal and/or the control information of the group periodically, which may reduce power consumption of the terminal effectively.

Specifically, the terminal may specifically receive the priority information transmitted by the base station through a high layer signaling or a system broadcast message.

Alternatively, the base station may also transmit the priority information to the terminal not through a high layer signaling or a system broadcast message, the terminal may also obtain the priority information according to predetermined configuration, such as an agreement.

In this embodiment, by acquiring subframe configuration information of a terminal, where the subframe configuration information is used for indicating a first subframe for transmitting dedicated control information of the terminal and a second subframe for transmitting control information of a group to which the terminal belongs, the dedicated control information of the terminal transmitted by a base station can be blindly detected and received over the first subframe and/or the control information of the group transmitted by the base station can be received over the second subframe according to the subframe configuration information, thereby achieving downlink control information transmission between a base station and a terminal.

Since the subframes occupied by the transmission of the dedicated control information of the terminal and by the transmission of control information of the group to which the terminal belongs are different subframes, as for the terminal, the terminal only needs to perform blind detection in the search space of the group to which the terminal belongs or the specific search space of the terminal in each subframe, thus the blind detection times of the UE will not be increased then, therefore, the times of blind detection performed by the terminal in each subframe can meet the maximum tolerable blind detection times in an existing standard.

In an MTC application with a large number of terminals, a plurality of MTC terminals may be grouped into a group to be scheduled. The concept of the group is not limited to such an expression as group, and may also be replaced by a similar expression, such as a bunch, a cluster and a category. The base station may schedule a terminal or a plurality of terminals in a group through control information for downlink data group scheduling, a CRC of the control information for downlink data group scheduling is scrambled by a group-based RNTI, the group identity is written as a Group-RNTI in this embodiment, and is not limited to being written as the Group-RNTI in practical application. If a type of search space is defined for a group to which a terminal belongs, it may be referred to as a search space of the group to which the terminal belongs in the present application, then, in each subframe, the terminal needs to perform blind detection in the search space of the group to which the terminal belongs and a specific search space of the terminal, respectively, thus the blind detection times of the terminal will be increased, and may exceed the maximum tolerable blind detection times in an existing standard.

Figure 9:
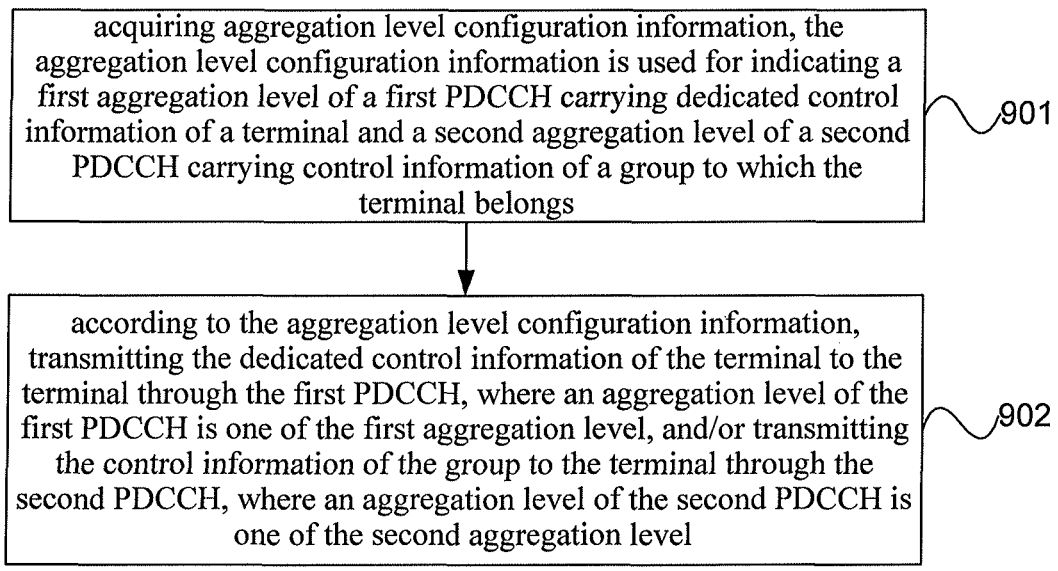
FIG. 9 is a schematic flow chart of a method for downlink control information transmission according to another embodiment of the present application.

FIG. 9 is a schematic flow chart of a method for downlink control information transmission according to another embodiment of the present application, as shown in FIG. 9.

901, acquiring aggregation level configuration information, the aggregation level configuration information is used for indicating a first aggregation level of a first PDCCH carrying dedicated control information of a terminal and a second aggregation level of a second PDCCH carrying control information of a group to which the terminal belongs.

The sum of quantity of PDCCH candidates corresponding to the first aggregation levels and PDCCH candidates corresponding to the second aggregation levels is less than or equal to the sum of maximum quantity of the PDCCH candidates corresponding to all aggregation levels in an existing standard.

902, according to the aggregation level configuration information, transmitting the dedicated control information of the terminal to the terminal through the first PDCCH, where an aggregation level of the first PDCCH is one of the first aggregation level, and/or transmitting the control information of the group to the terminal through the second PDCCH, where an aggregation level of the second PDCCH is one of the second aggregation level.

Alternatively, in a possible implementation of this embodiment, before 901, the method further includes:

acquiring the aggregation level indication information, the aggregation level indication information is used for indicating the first aggregation levels of the first PDCCH carrying the dedicated control information of the terminal and/or the second aggregation levels of the second PDCCH carrying the control information of the group to which the terminal belongs; then, determining the first aggregation levels of the first PDCCH and the second aggregation levels of the second PDCCH according to the aggregation level indication information; and determining the aggregation level configuration information according to the first aggregation levels of the first PDCCH and the second aggregation levels of the second PDCCH.

It should be noted, an executive agent for 901 and 902 described above may be a base station.

It should be noted, the method for processing the aggregation level indication information in this embodiment is similar to the method for processing the subframe information, reference may be made to contents about the subframe information in the foregoing embodiments for detailed descriptions, and will not be repeated herein.

For example, as indicated by the aggregation level indication information, if the aggregation level of the first PDCCH carrying the dedicated control information of the terminal is 4 and the aggregation level of the second PDCCH carrying the control information of the group to which the terminal belongs is 2, then, when transmitting, the base station only transmits the first PDCCH of which the aggregation level is 4 and/or the second PDCCH of which the aggregation level is 2; correspondingly, when receiving, the terminal only blindly detects the first PDCCH of which the aggregation level is 4 and/or the second PDCCH of which the aggregation level is 2.

In this embodiment, aggregation levels of the first PDCCH carrying the dedicated control information of the terminal may be the first aggregation levels, aggregation levels of the second PDCCH carrying the control information of the group may be the second aggregation levels, as for the terminal, by reasonably selecting quantity of the first aggregation levels and the second aggregation levels in each subframe by the terminal, it can be achieved by the terminal that the sum of times of blind detection performed to the first aggregation levels and the second aggregation levels can meet the maximum tolerable blind detection times in an existing standard.

Figure 10:
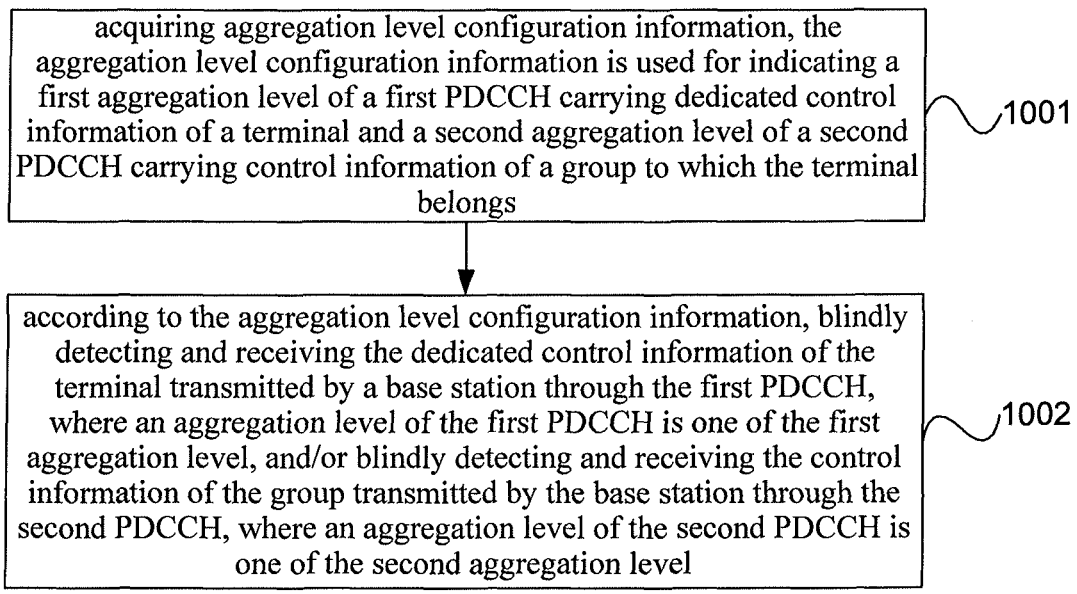
FIG. 10 is a schematic flow chart of a method for downlink control information transmission according to another embodiment of the present application.

FIG. 10 is a schematic flow chart of a method for downlink control information transmission according to another embodiment of the present application, as shown in FIG. 10.

1001, acquiring aggregation level configuration information, the aggregation level configuration information is used for indicating a first aggregation level of a first PDCCH carrying dedicated control information of a terminal and a second aggregation level of a second PDCCH carrying control information of a group to which the terminal belongs.

The sum of quantity of PDCCH candidates corresponding to the first aggregation levels and PDCCH candidates corresponding to the second aggregation levels is less than or equal to the sum of maximum quantity of the PDCCH candidates corresponding to all aggregation levels in an existing standard.

1002, according to the aggregation level configuration information, blindly detecting and receiving the dedicated control information of the terminal transmitted by a base station through the first PDCCH, where an aggregation level of the first PDCCH is one of the first aggregation level, and/or blindly detecting and receiving the control information of the group transmitted by the base station through the second PDCCH, where an aggregation level of the second PDCCH is one of the second aggregation level.

Alternatively, in a possible implementation of this embodiment, before 1001, the method further includes: acquiring the aggregation level indication information, the aggregation level indication information is used for indicating the first aggregation levels of the first PDCCH carrying the dedicated control information of the terminal and/or the second aggregation levels of the second PDCCH carrying the control information of the group to which the terminal belongs; then, determining the first aggregation levels of the first PDCCH and the second aggregation levels of the second PDCCH according to the aggregation level indication information; and determining the aggregation level configuration information according to the first aggregation levels of the first PDCCH and the second aggregation levels of the second PDCCH.

It should be noted, an executive agent for 1001 and 1002 described above may be a terminal.

It should be noted, the method for processing the aggregation level indication information in this embodiment is similar to the method for processing the subframe information, reference may be made to contents about the subframe information in the foregoing embodiments for detailed descriptions, and will not be repeated herein.

For example, as indicated by the aggregation level indication information, if the aggregation level of the first PDCCH carrying the dedicated control information of the terminal is 4 and the aggregation level of the second PDCCH carrying the control information of the group to which the terminal belongs is 2, then, when transmitting, the base station only transmits the first PDCCH of which the aggregation level is 4 and/or the second PDCCH of which the aggregation level is 2; correspondingly, when receiving, the terminal only blindly detects the first PDCCH of which the aggregation level is 4 and/or the second PDCCH of which the aggregation level is 2.

In this embodiment, aggregation levels of the first PDCCH carrying the dedicated control information of the terminal may be the first aggregation levels, aggregation levels of the second PDCCH carrying the control information of the group may be the second aggregation levels, as for the terminal, the sum of times of blind detection performed by the terminal in each subframe to the first aggregation levels and the second aggregation levels can meet the maximum tolerable blind detection times in an existing standard.

Figure 11:
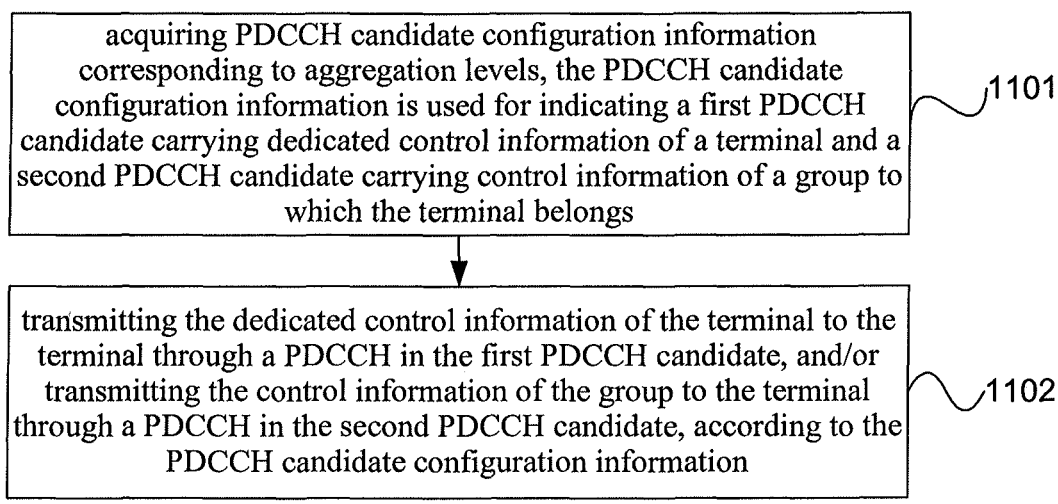
FIG. 11 is a schematic flow chart of a method for downlink control information transmission according to another embodiment of the present application.

FIG. 11 is a schematic flow chart of a method for downlink control information transmission according to another embodiment of the present application, as shown in FIG. 11.

1101, acquiring PDCCH candidate configuration information corresponding to aggregation levels, the PDCCH candidate configuration information is used for indicating a first PDCCH candidate carrying dedicated control information of a terminal and a second PDCCH candidate carrying control information of a group to which the terminal belongs.

The sum of quantity of the first PDCCH candidates and the second PDCCH candidates is less than or equal to maximum quantity of the PDCCH candidates corresponding to the aggregation levels in an existing standard.

1102, transmitting the dedicated control information of the terminal to the terminal through a PDCCH in the first PDCCH candidate, and/or transmitting the control information of the group to the terminal through a PDCCH in the second PDCCH candidate, according to the PDCCH candidate configuration information.

Alternatively, in a possible implementation of this embodiment, before 1101, the method further includes: acquiring PDCCH candidate indication information corresponding to the aggregation levels, the PDCCH candidate indication information is used for indicating the first PDCCH candidate carrying the dedicated control information of the terminal and/or the second PDCCH candidate carrying the control information of the group to which the terminal belongs; then, determining the first PDCCH candidate and the second PDCCH candidate according to the PDCCH candidate indication information; and determining the PDCCH candidate configuration information according to the first PDCCH candidate and the second PDCCH candidate.

It should be noted, an executive agent for 1101 and 1102 described above may be a base station.

It should be noted, the method for processing the aggregation level indication information in this embodiment is similar to the method for processing the subframe information, reference may be made to related contents about the subframe information in the foregoing embodiments for detailed descriptions, and will not be repeated herein.

For example, as for aggregation level 1, the maximum quantity of PDCCH candidates is 6 in an existing standard, then, if the first PDCCH candidates carrying the dedicated control information of the terminal which are indicated by the PDCCH candidate indication information may be 3, the second PDCCH candidates carrying the control information of the group to which the terminal belongs may also be 3, or, the first PDCCH candidates carrying the dedicated control information of the terminal may be 2, then the second PDCCH candidates carrying the control information of the group to which the terminal belongs may be 4, as long as the sum of them does not exceed 6. Then, when transmitting a PDCCH of which an aggregation level is 1, the base station only transmits one of the first PDCCH candidates corresponding to the aggregation level and/or one of the second PDCCH candidates corresponding to the aggregation level; correspondingly, when receiving, the terminal only blindly detects one of the first PDCCH candidates corresponding to the aggregation level and/or one of the second PDCCH candidates corresponding to the aggregation level.

In this embodiment, a PDCCH carrying the dedicated control information of the terminal may be the first PDCCH candidate, a PDCCH carrying the control information of the group may be the second PDCCH candidate, as for the terminal, the sum of times of blind detection performed by the terminal in each subframe to the first PDCCH candidates and the second PDCCH candidates corresponding to all aggregation levels can meet the maximum tolerable blind detection times in an existing standard.

Figure 12:
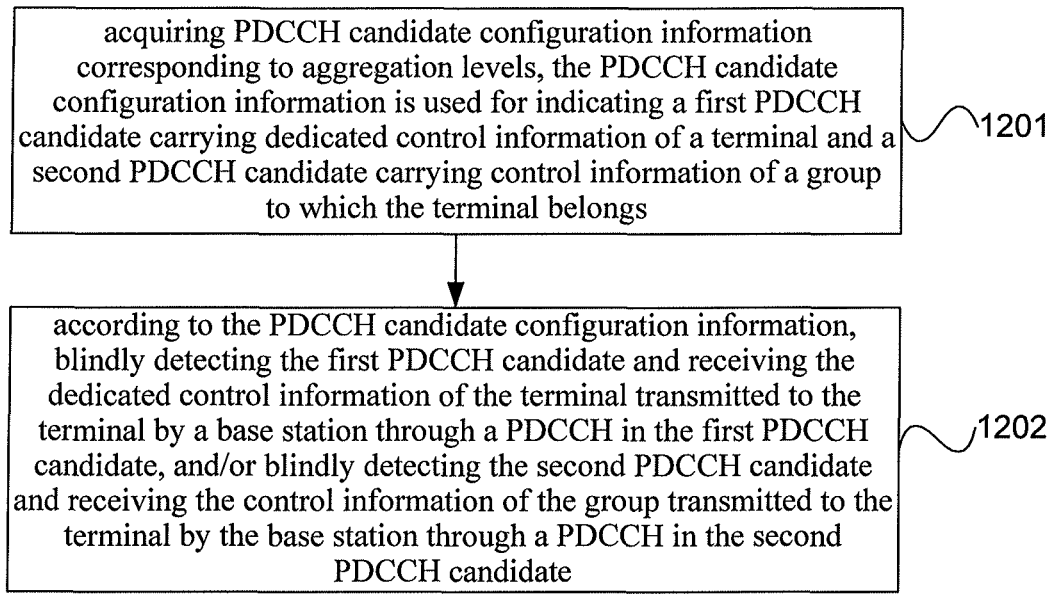
FIG. 12 is a schematic flow chart of a method for downlink control information transmission according to another embodiment of the present application.

FIG. 12 is a schematic flow chart of a method for downlink control information transmission according to another embodiment of the present application, as shown in FIG. 12.

1201, acquiring PDCCH candidate configuration information corresponding to aggregation levels, the PDCCH candidate configuration information is used for indicating a first PDCCH candidate carrying dedicated control information of a terminal and a second PDCCH candidate carrying control information of a group to which the terminal belongs.

The sum of quantity of the first PDCCH candidates and the second PDCCH candidates is less than or equal to maximum quantity of the PDCCH candidates corresponding to the aggregation levels in an existing standard.

1202, according to the PDCCH candidate configuration information, blindly detecting the first PDCCH candidate and receiving the dedicated control information of the terminal transmitted to the terminal by a base station through a PDCCH in the first PDCCH candidate, and/or blindly detecting the second PDCCH candidate and receiving the control information of the group transmitted to the terminal by the base station through a PDCCH in the second PDCCH candidate.

Alternatively, in a possible implementation of this embodiment, before 1201, the method further includes: acquiring the PDCCH candidate indication information corresponding to the aggregation levels, the PDCCH candidate indication information is used for indicating the first PDCCH candidate carrying the dedicated control information of a terminal and/or the second PDCCH candidate canying the control information of the group to which the terminal belongs; then, determining the first PDCCH candidate and/or the second PDCCH candidate according to the PDCCH candidate indication information; and determining the PDCCH candidate configuration information according to the first PDCCH candidate and/or the second PDCCH candidate.

It should be noted, an executive agent for 1201 and 1202 described above may be a terminal.

It should be noted, the method for processing the aggregation level indication information in this embodiment is similar to the method for processing the subframe information, reference may be made to related contents about the subframe information in the foregoing embodiments for detailed descriptions, and will not be repeated herein.

For example, as for aggregation level 1, the maximum quantity of PDCCH candidates is 6 in an existing standard, then, if the first PDCCH candidates carrying the dedicated control information of the terminal which are indicated by the PDCCH candidate indication information may be 3, the second PDCCH candidates carrying the control information of the group to which the terminal belongs may also be 3, or, the first PDCCH candidates canying the dedicated control information of the terminal may be 2, then the second PDCCH candidates carrying the control information of the group to which the terminal belongs may be 4, as long as the sum of them does not exceed 6. Then, when transmitting a PDCCH of which an aggregation level is 1, the base station only transmits one of the first PDCCH candidates corresponding to the aggregation level and/or one of the second PDCCH candidates corresponding to the aggregation level; correspondingly, when receiving, the terminal only blindly detects one of the first PDCCH candidates corresponding to the aggregation level and/or one of the second PDCCH candidates corresponding to the aggregation level.

In this embodiment, a PDCCH carrying the dedicated control information of the terminal may be the first PDCCH candidate, a PDCCH carrying the control information of the group may be the second PDCCH candidate, as for the terminal, the sum of times of blind detection performed by the terminal in each subframe to the first PDCCH candidates and the second PDCCH candidates corresponding to all aggregation levels can meet the maximum tolerable blind detection times in an existing standard.

The embodiment corresponding to FIG. 9 may be further combined with the embodiment corresponding to FIG. 11; correspondingly, the embodiment corresponding to FIG. 10 may be further combined with the embodiment corresponding to FIG. 12. For example, as indicated by the aggregation level indication information, if aggregation levels of first PDCCHs carrying the dedicated control information of the terminal are 1 and 2, aggregation levels of second PDCCHs carrying the control information of the group to which the terminal belongs are 2, 4 and 8; if first PDCCH candidates carrying the dedicated control information of the terminal are 3, where the first PDCCH candidates are indicated by the PDCCH candidate indication information and corresponding to the aggregation level 2 (i.e. corresponding to the first PDCCH), second PDCCH candidates carrying the control information of the group to which the terminal belongs (i.e. corresponding the second PDCCH) are 3. Then, when transmitting, a base station only transmits a first PDCCH of which an aggregation level is 1 or 2 and/or a second PDCCH of which an aggregation level is 2, 4 or 8, when transmitting the first PDCCH of which an aggregation level is 2, the base station only transmits one of the first PDCCH candidates corresponding to the aggregation level, when transmitting the second PDCCH of which an aggregation level is 2, the base station only transmits one of the second PDCCH candidates corresponding to the aggregation level.

It should be noted, in order to describe the forgoing method embodiments in a simple way, the embodiments are expressed as a series of action combinations; however, persons skilled in the art should know that the present application is not limited to the described action sequence because on the basis of the present application, some steps may be performed in other sequences or performed at the same time. Secondly, persons skilled in the art should also know that the embodiments described in the specification are exemplary embodiments, and the involved actions and modules are not indispensable parts of the present application.

In the foregoing embodiments, each embodiment is described with different emphasis; for the part not elaborated in an embodiment, reference may be made to related description in other embodiments.

Figure 5:
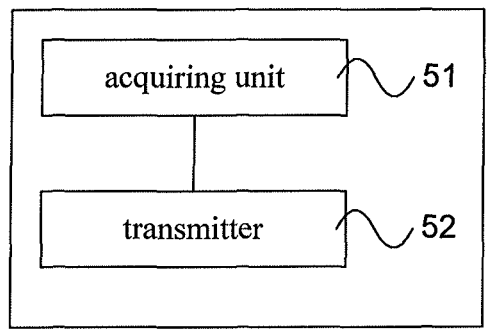
FIG. 5 is a schematic structural diagram of a base station according to another embodiment of the present application.

FIG. 5 is a schematic structural diagram of a base station according to another embodiment of the present application, as shown in FIG. 5, the base station in this embodiment may include an acquiring unit 51 and a transmitter 52. The acquiring unit 51 is configured to acquire subframe configuration information of a terminal, the subframe configuration information is used for indicating a first subframe for transmitting common control information and a second subframe for transmitting dedicated control information; the transmitter 52 is configured to, according to the subframe configuration information, transmitting to the terminal the common control information over the first subframe, and/or transmitting to the terminal the dedicated control information over the second subframe.

The first subframe is not overlapped with the second subframe.

Alternatively, in a possible implementation of this embodiment, the transmitter 52 may further transmit subframe information to the terminal, where the subframe information is used for indicating the first subframe for transmitting the common control information and/or the second subframe for transmitting the dedicated control information, so that the terminal determines the first subframe and the second subframe according to the subframe information.

Specifically, the transmitter 52 may specifically transmit the subframe information to the terminal through a high layer signaling or a system broadcast message.

Alternatively, the transmitter 52 may also transmit the subframe information to the terminal not through a high layer signaling or a system broadcast message; the terminal may also obtain the subframe information according to predetermined configuration, such as an agreement.

Alternatively, in a possible implementation of this embodiment, the transmitter 52 may further transmit indication information to the terminal, so that the terminal determines the second subframe according to the indication information and the first subframe indicated by the subframe information; or, so that the terminal determines the first subframe according to the indication information and the second subframe indicated by the subframe information.

Specifically, the transmitter 52 may specifically transmit the indication information to the terminal through a high layer signaling or a system broadcast message.

Alternatively, the transmitter 52 may also transmit the indication information to the terminal not through a high layer signaling or a system broadcast message, the terminal may also obtain the indication information according to predetermined configuration, such as an agreement.

In an MTC application with a large number of terminals, a plurality of MTC terminals may compose a whole part, i.e. a group. The base station may schedule a terminal or a plurality of terminals in a group through control information for downlink data group scheduling. If a group to which a terminal belongs defines a type of search space, which may be referred to as a search space of the group in the present application. Then, in each subframe, the terminal then needs to make blind detections in a search space of the group and a UE specific search space, respectively, thus the blind detection times of the UE will be increased, and may exceed the maximum tolerable blind detection times in an existing standard. Therefore, in a possible implementation of this embodiment, the second sbuframe for transmitting the dedicated control information indicated by the subframe configuration information acquired by the acquiring unit 51 may include:

a third subframe for transmitting dedicated control information of the terminal; and/or a fourth subframe for transmitting control information of a group to which the terminal belongs.

It can be understood that the third subframe is not overlapped with the fourth subframe.

Correspondingly, the transmitter 52 may specifically transmit the dedicated control information of the terminal to the terminal over the third subframe; and/or transmit the control information of the group to which the terminal belongs to the terminal over the fourth subframe.

Since the subframes occupied by the transmission of the dedicated control information of the terminal and by the transmission of the control information of the group to which the terminal belongs are different subframes, as for the terminal, the terminal only needs to perform blind detection in the search space of the group to which the terminal belongs or the specific search space of the terminal in each subframe, thus the blind detection times of the UE will not be increased, therefore, the times of blind detection performed by the terminal in each subframe can meet the maximum tolerable blind detection times in an existing standard.

In this embodiment, a base station acquires subframe configuration information of a terminal through an acquiring unit, where the subframe configuration information is used for indicating a first subframe for transmitting common control information and a second subframe for transmitting dedicated control information, so that a transmitter can transmit the common control information to the terminal over the first subframe and/or transmit the dedicated control information to the terminal over the second subframe according to the subframe configuration information, thereby achieving downlink control information transmission between a base station and a terminal.

Additionally, since the subframes occupied by a common search space for transmitting common control information and a UE-specific search space for transmitting dedicated control information are different subframes, thus, as for an MTC terminal, it can be achieved that the MTC terminal can correctly receive the common control information or the dedicated control information transmitted over each subframe.

Figure 6A:
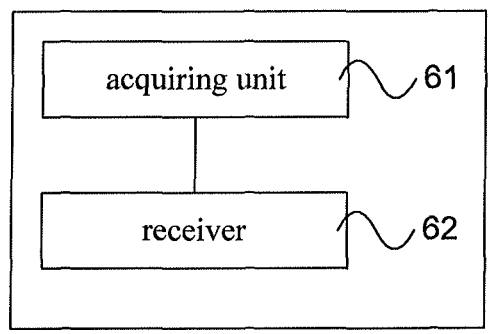
FIG. 6A is a schematic structural diagram of a terminal according to another embodiment of the present application.

FIG. 6A is a schematic structural diagram of a terminal according to another embodiment of the present application, as shown in FIG. 6A. The terminal in this embodiment may include an acquiring unit 61 and a receiver 62. The acquiring unit 61 is configured to acquire subframe configuration information of a terminal, the subframe configuration information is used for indicating a first subframe for transmitting common control information and a second subframe for transmitting dedicated control information; the receiver 62 is configured to, according to the subframe configuration information, blindly detect and receive the common control information transmitted by a base station over the first subframe, and/or blindly detect and receive the dedicated control information transmitted by the base station over the second subframe.

Alternatively, in a possible implementation of this embodiment, the first subframe is not overlapped with the second subframe.

Figure 6B:
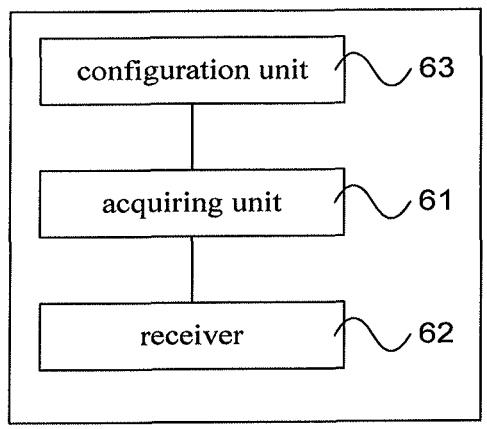
FIG. 6B is a schematic structural diagram of a terminal according to another embodiment of the present application.

Alternatively, in a possible implementation of this embodiment, as shown in FIG. 6B, the terminal in this embodiment may further include a configuration unit 63, configured to: acquire subframe information of the terminal, where the subframe information is used for indicating the first subframe for transmitting the common control information and/or the second subframe for transmitting the dedicated control information, determine the first subframe for transmitting the common control information and the second subframe for transmitting the dedicated control information according to the subframe information, and determine the subframe configuration information according to the first subframe and the second subframe.

It can be understood, the first subframe is not overlapped with the second subframe.

Alternatively, in a possible implementation of this embodiment, the configuration unit 63 may specifically receive the subframe information transmitted by the base station.

Specifically, the configuration unit 63 may specifically receive the subframe information transmitted by the base station through a high layer signaling or a system broadcast message.

Alternatively, the base station may also transmit the subframe information to the terminal not through a high layer signaling or a system broadcast message; the configuration unit 63 may also obtain the subframe information according to predetermined configuration, such as an agreement.

Alternatively, in a possible implementation of this embodiment, a subframe indicated by the subframe information acquired by the configuration unit 63 is the first subframe; the configuration unit 63 may further acquire indication information; correspondingly, the configuration unit 63 may specifically determine the second subframe according to the indication information and the first subframe indicated by the subframe information.

Alternatively, in a possible implementation of this embodiment, a subframe indicated by the subframe information acquired by the configuration unit 63 is the second subframe; the configuration unit 63 may further acquire indication information; correspondingly, the configuration unit 63 may specifically determine the first subframe according to the indication information and the second subframe indicated by the subframe information.

Specifically, a way for the configuration unit 63 to acquire indication information may be the following:

the configuration unit 63 may receive the indication information transmitted by the base station through a high layer signaling or a system broadcast message; or the base station may also transmit the indication information to the terminal not through a high layer signaling or a system broadcast message; the configuration unit 63 may also obtain the indication information according to predetermined configuration, such as an agreement.

In an MTC application with a large number of terminals, a plurality of MTC terminals may compose a whole part, i.e. a group. The base station may schedule a terminal or a plurality of terminals in a group through control information for downlink data group scheduling. If a group to which a terminal belongs defines a type of search space, which may be referred to as a search space of the group in the present application, then, in each subframe, the terminal then needs to make blind detections in a search space of the group and a UE specific search space, respectively, thus the blind detection times of the UE will be increased, and may exceed the maximum tolerable blind detection times in an existing standard. Therefore, in a possible implementation of this embodiment, the second subframe for transmitting the dedicated control information indicated by the subframe configuration information acquired by the acquiring unit 61 may include:

a third subframe for transmitting dedicated control information of the terminal; and/or a fourth subframe for transmitting control information of a group to which the terminal belongs.

It can be understood, the third subframe is not overlapped with the fourth subframe.

Correspondingly, the configuration unit 63 may specifically determine, according to the subframe information, the third subframe for transmitting the dedicated control information of the terminal and the fourth subframe for transmitting the control information of the group to which the terminal belongs.

Correspondingly, the receiver 61 may specifically blindly detect and receive dedicated control information of the terminal transmitted by the base station over the third subframe; and/or blindly detect and receive control information of a group to which the terminal belongs transmitted by the base station over the fourth subframe.

Since the subframes occupied by the transmission of the dedicated control information of the terminal and by the transmission of the control information of the group to which the terminal belongs are different subframes, as for the terminal, the terminal only needs to perform blind detection in the search space of the group to which the terminal belongs or the specific search space of the terminal in each subframe, thus the blind detection times of the UE will not be increased, therefore, the times of blind detection performed by the terminal in each subframe can meet the maximum tolerable blind detection times in an existing standard.

In this embodiment, a terminal acquires subframe configuration information of a terminal through an acquiring unit, where the subframe configuration information is used for indicating a first subframe for transmitting common control information and a second subframe for transmitting dedicated control information, so that a transmitter can blindly detect and receive the common control information transmitted by a base station over the first subframe and/or blindly detect and receive the dedicated control information transmitted by the base station over the second subframe according to the subframe configuration information, thereby achieving downlink control information transmission between a base station and a terminal.

Additionally, since the subframes occupied by a common search space for transmitting common control information and a UE-specific search space for transmitting dedicated control information are different subframes, thus, as for an MTC terminal, it can be achieved that the MTC terminal can correctly receive the common control information or the dedicated control information transmitted over each subframe.

Figure 7:
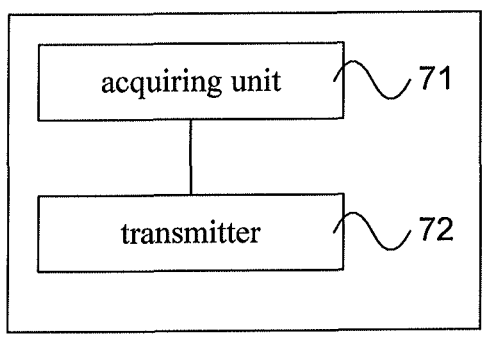
FIG. 7 is a schematic structural diagram of a base station according to another embodiment of the present application.

FIG. 7 is a schematic structural diagram of a base station according to another embodiment of the present application, as shown in FIG. 7, the base station in this embodiment may include an acquiring unit 71 and a transmitter 72. The acquiring unit 71 is configured to acquire subframe configuration information of a terminal, the subframe configuration information is used for indicating a first subframe for transmitting dedicated control information of the terminal and a second subframe for transmitting control information of a group to which the terminal belongs; the transmitter 72 is configured to, according to the subframe configuration information, transmit the dedicated control information of the terminal to the terminal over the first subframe, and/or transmit the control information of the group to the terminal over the second subframe.

Alternatively, in a possible implementation of this embodiment, the first subframe is not overlapped with the second subframe.

It may be understood, the first subframe is not overlapped with the second subframe.

In an MTC application with a large number of terminals, a plurality of MTC terminals may compose a whole part, i.e. a group. The base station may schedule a terminal or a plurality of terminals in a group through control information for downlink data group scheduling. If a group to which a terminal belongs defines a type of search space, which may be referred to as a search space of the group in the present application, then, in each sub frame, the terminal then needs to make blind detections in a search space of the group and a UE specific search space, respectively, thus the blind detection times of the UE will be increased, and may exceed the maximum tolerable blind detection time in an existing standard.

This is to say, in this embodiment, a UE specific search space for transmitting dedicated control information of the terminal occupies a first subframe, and a search space of a group for transmitting control information of the group to which the terminal belongs occupies a second subframe.

Since the subframes occupied by the transmission of the dedicated control information of the terminal and by the transmission of the control information of the group to which the terminal belongs are different subframes, as for the terminal, the terminal only needs to perform blind detection in the search space of the group to which the terminal belongs or the specific search space of the terminal in each subframe, thus the blind detection times of a UE will not be increased, therefore, the times of blind detection performed by the terminal in each subframe can meet the maximum tolerable blind detection times in an existing standard.

Alternatively, in a possible implementation of this embodiment, the transmitter 72 may further transmit subframe information to the terminal, where the subframe information is used for indicating the first subframe for transmitting the dedicated control information of the terminal and/or the second subframe for transmitting the control information of the group to which the terminal belongs, so that the terminal determines the first subframe and the second subframe according to the subframe information.

Specifically, the transmitter 72 may specifically transmit the subframe information to the terminal through a high layer signaling or a system broadcast message.

Alternatively, the transmitter 72 may also transmit the subframe information to the terminal not through a high layer signaling or a system broadcast message; the terminal may also obtain the subframe information according to predetermined configuration, such as an agreement.

Alternatively, in a possible implementation of this embodiment, the transmitter 72 may further transmit indication information to the terminal, so that the terminal determines the second subframe according to the indication information and the first subframe indicated by the subframe information; or, so that the terminal determines the first subframe according to the indication information and the second subframe indicated by the subframe information.

Specifically, the transmitter 72 may specifically transmit the indication information to the terminal through a high layer signaling or a system broadcast message.

Alternatively, the transmitter 72 may also transmit the indication information to the terminal not through a high layer signaling or a system broadcast message; the terminal may also obtain the indication information according to predetermined configuration, such as an agreement.

In this embodiment, a base station acquires subframe configuration information of a terminal through an acquiring unit, where the subframe configuration information is used for indicating a first subframe for transmitting dedicated control information of the terminal and a second subframe for transmitting control information of a group to which the terminal belongs, so that a transmitter can transmit the dedicated control information of the terminal to the terminal over the first subframe and/or transmit the control information of the group to the terminal over the second subframe according to the subframe configuration information, thereby achieving downlink control information transmission between a base station and a terminal. Since the subframes occupied by the transmission of the dedicated control information of the terminal and by the transmission of the control information of the group to which the terminal belongs are different subframes, as for the terminal, the terminal only needs to perform blind detection in the search space of the group to which the terminal belongs or the specific search space of the terminal in each subframe, thus the blind detection times of the UE will not be increased, therefore, the times of blind detection performed by the terminal in each subframe can meet the maximum tolerable blind detection times in an existing standard.

Figure 8A:
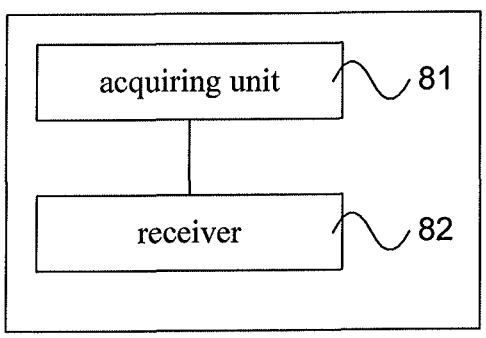
FIG. 8A is a schematic structural diagram of a terminal according to another embodiment of the present application.

FIG. 8A is a schematic structural diagram of a terminal according to another embodiment of the present application, as shown in FIG. 8A, the terminal in this embodiment may include an acquiring unit 81 and a receiver 82. The acquiring unit 81 is configured to acquire subframe configuration information of a terminal, the subframe configuration information is used for indicating a first subframe for transmitting dedicated control information of the terminal and a second subframe for transmitting control information of a group to which the terminal belongs; the receiver 82 is configured to, according to the subframe configuration information, blindly detect and receive dedicated control information of the terminal transmitted by a base station over the first subframe, and/or blindly detect and receive control information of the group transmitted by the base station over the second subframe.

Alternatively, in a possible implementation of this embodiment, the first subframe is not overlapped with the second subframe.

Figure 8B:
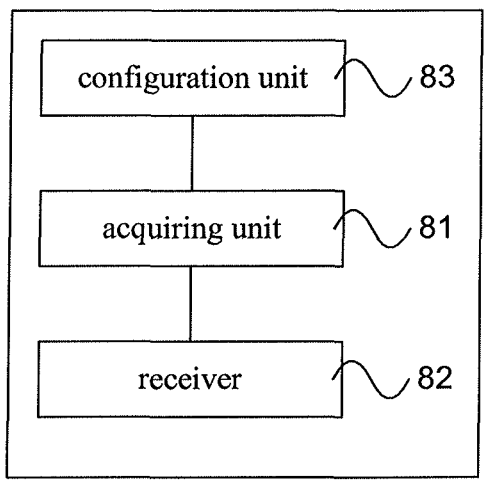
FIG. 8B is a schematic structural diagram of a terminal according to another embodiment of the present application.

Alternatively, in a possible implementation of this embodiment, as shown in FIG. 8B, the terminal in this embodiment may also include a configuration unit 83, configured to: acquire subframe information of the terminal, where the subframe information is used for indicating the first subframe for transmitting the dedicated control information of the terminal and/or the second subframe for transmitting the control information of the group to which the terminal belongs; then, determine the first subframe for transmitting the dedicated control information of the terminal and the second subframe for transmitting the control information of the group according to the subframe information; and determine the subframe configuration information according to the first subframe and the second subframe.

It can be understood, the first subframe is not overlapped with the second subframe.

In an MTC application with a large number of terminals, a plurality of MTC terminals may compose a whole part, i.e. a group. The base station may schedule a terminal or a plurality of terminals in a group through control information for downlink data group scheduling. If a group to which a terminal belongs defines a type of search space, which may be referred to as a search space of the group in the present application. Then, in each subframe, the terminal needs to perform blind detection in a search space of the group and a UE specific search space, respectively, thus the blind detection times of the UE will be increased, and may exceed the maximum tolerable blind detection times in an existing standard.

This is to say, in this embodiment, the UE specific search space for transmitting the dedicated control information of the terminal occupies the first subframe, and the search space of the group for transmitting the control information of the group to which the terminal belongs occupies the second subframe.

Since the subframes occupied by the transmission of the dedicated control information of the terminal and by the transmission of the control information of the group to which the terminal belongs are different subframes, as for the terminal, the terminal only needs to perform blind detection in the search space of the group to which the terminal belongs or the specific search space of the terminal in each subframe, thus the blind detection times of the UE will not be increased, therefore, the times of blind detection performed by the terminal in each subframe can meet the maximum tolerable blind detection times in an existing standard.

Alternatively, in a possible implementation of this embodiment, the configuration unit 83 may specifically receive the subframe information transmitted by the base station, so that the configuration unit 83 determines the first subframe and the second subframe according to the subframe information.

Specifically, the configuration unit 83 may receive the subframe information transmitted by the base station through a high layer signaling or a system broadcast message specifically.

Alternatively, the base station may also transmit the subframe information to the terminal not through a high layer signaling or a system broadcast message; the configuration unit 83 may also obtain the subframe information according to predetermined configuration, such as an agreement.

Alternatively, in a possible implementation of this embodiment, a subframe indicated by the subframe information received by the configuration unit 83 is the first subframe; then, the configuration unit 83 may further acquire indication information; correspondingly, the configuration unit 83 may specifically determine the second subframe according to the indication information and the first subframe indicated by the subframe information.

Alternatively, in a possible implementation of this embodiment, a subframe indicated by the subframe information received by the configuration unit 83 is the second subframe; then, the configuration unit 83 may further acquire indication information; correspondingly, the configuration unit 83 may specifically determine the first subframe according to the indication information and the second subframe indicated by the subframe information.

Alternatively, in a possible implementation of this embodiment, the configuration unit 83 may specifically receive the indication information transmitted by the base station, so that the configuration unit 83 determines the second subframe according to the indication information and the first subframe indicated by the subframe information; or, so that the configuration unit 83 determines the first subframe according to the indication information and the second subframe indicated by the subframe information.

Specifically, the configuration unit 83 may specifically receive the indication information transmitted by the base station through a high layer signaling or a system broadcast message.

Alternatively, the base station may also transmit the indication information to the terminal not through a high layer signaling or a system broadcast message; the configuration unit 83 may also obtain the indication information according to predetermined configuration, such as an agreement.

In this embodiment, a terminal acquires subframe configuration information of a terminal through an acquiring unit, where the subframe configuration information is used for indicating a first subframe for transmitting dedicated control information of the terminal and a second subframe for transmitting control information of a group to which the terminal belongs, so that a receiver can blindly detect and receive the dedicated control information of the terminal transmitted by a base station over the first subframe and/or receive the control information of the group transmitted by the base station over the second subframe according to the subframe configuration information, thereby achieving downlink control information transmission between a base station and a terminal. Since the subframes occupied by the transmission of the dedicated control information of the terminal and by the transmission of the control information of the group to which the terminal belongs are different subframes, as for the terminal, the terminal only needs to perform blind detection in the search space of the group to which the terminal belongs or the specific search space of the terminal in each subframe, thus the blind detection times of the UE will not be increased, therefore, the times of blind detection performed by the terminal in each subframe can meet the maximum tolerable blind detection times in an existing standard.

It may be clearly understood by a person skilled in the art that, for the purpose of convenient and brief description, reference may be made to corresponding processes in the foregoing method embodiments for detailed working processes of the system, the apparatus and the unit described above, which will not be repeated herein.

In several embodiments provided in the present application, it should be understood that the disclosed system, apparatus, and method may be implemented in other manners. For example, the described apparatus embodiment is merely exemplary. For example, the unit division is merely a logical function division and there may be other divisions during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, i.e. may be located in one position, or may be distributed on a plurality of network units. A part or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a hardware plus software functional unit.

The integrated unit, which is implemented in the form of the software functional unit described above, may be stored in a computer-readable storage medium. The described software functional unit is stored in a storage medium, and includes several instructions for instructing a computer device (which may be a personal computer, a server, or a network device) or a processor (processor) to perform a part of the steps of the methods described in the embodiments of the present application. The foregoing storage medium includes: any medium that can store program codes, such as a USB flash disk, a mobile hard disk, a read-only memory (ROM), a random access memory (RAM), a magnetic disk, or an optical disc.

Finally, it should be noted that the foregoing embodiments are merely intended for describing the technical solutions of the present application other than limiting the present application. Although the present application is described in detail with reference to the foregoing embodiments, a person of ordinary skill in the art should understand that he may still make modifications to the technical solutions described in the foregoing embodiments, or make equivalent replacements to some technical features thereof; and these modifications or replacements will not make the nature of corresponding technical solutions depart from the spirit and scope of the technical solutions of the embodiments of the present application.

What is claimed is:

1. A method for downlink control information transmission, comprising:

acquiring subframe configuration information of a terminal, wherein the subframe configuration information is used for indicating a first subframe for transmitting common control information and a second subframe for transmitting dedicated control information, and the first subframe overlaps with the second subframe;

at least one of: transmitting the common control information to the terminal over the first subframe, and transmitting the dedicated control information to the terminal over the second subframe, according to the subframe configuration information; and after the acquiring the subframe configuration information of the terminal, further comprises:

transmitting subframe information to the terminal through a high layer signaling or a system broadcast message, wherein the subframe information is used for indicating the first subframe or the second subframe;

transmitting indication information to the terminal;

transmitting priority information to the terminal, wherein the priority information indicates a relationship between a priority of the common control information and a priority of the dedicated control information, so that the terminal:

determines the second subframe according to the indication information and the first subframe indicated by the subframe information or determines the first subframe according to the indication information and the second subframe indicated by the subframe information, determines that an overlapped subframe is the first subframe or the second subframe according to the subframe information and the priority information, and determines the subframe configuration information according to the first subframe and the second subframe.

2. The method according to claim 1, wherein, the second subframe for transmitting the dedicated control information indicated by the subframe configuration information comprises:

a third subframe for transmitting the dedicated control information of the terminal; and/or a fourth subframe for transmitting control information of a group to which the terminal belongs; wherein the third subframe is not overlapped with the fourth subframe;

the transmitting the dedicated control information to the terminal over the second subframe, comprising:

at least one of: transmitting to the terminal the dedicated control information of the terminal over the third subframe; and transmitting to the terminal the control information of the group to which the terminal belongs over the fourth subframe.

3. A method for downlink control information transmission, comprising:

acquiring subframe configuration information of a terminal, wherein the subframe configuration information is used for indicating a first subframe for transmitting common control information and a second subframe for transmitting dedicated control information;

at least one of: blindly detecting and receiving the common control information transmitted by a base station over the first subframe, and blindly detecting and receiving the dedicated control information transmitted by the base station over the second subframe, according to the subframe configuration information;

wherein, before the acquiring the subframe configuration information of the terminal, further comprises:

receiving subframe information of the terminal transmitted by the base station through a high layer signaling or a system broadcast message, wherein the subframe information is used for indicating the first subframe or the second subframe, and the first subframe overlaps with the second subframe;

receiving indication information;

receiving priority information, wherein the priority information indicates a relationship between a priority of the common control information and a priority of the dedicated control information;

determining the second subframe according to the indication information and the first subframe indicated by the subframe information or determining the first subframe according to the indication information and the second subframe indicated by the subframe information;

determining that an overlapped subframe is the first subframe or the second subframe according to the subframe information and the priority information; and determining the subframe configuration information according to the first subframe and the second subframe.

4. The method according to claim 3, wherein, the second subframe for transmitting the dedicated control information indicated by the subframe configuration information comprises:

a third subframe for transmitting the dedicated control information of the terminal; and/or a fourth subframe for transmitting control information of a group to which the terminal belongs; wherein the third subframe is not overlapped with the fourth subframe;

the blindly detecting and receiving the dedicated control information transmitted by the base station over the second subframe, comprising:

at least one of: blindly detecting and receiving dedicated control information of the terminal transmitted by the base station over the third subframe; and blindly detecting and receiving control information of a group to which the terminal belongs transmitted by the base station over the fourth subframe.

5. A base station, comprising:

a processor and a computer readable storage having computer instructions stored therein, the processor, when executing the instructions, configured to acquire subframe configuration information of a terminal, wherein the subframe configuration information is used for indicating a first subframe for transmitting common control information and a second subframe for transmitting dedicated control information, and the first subframe overlaps with the second subframe; and a transmitter, configured to:

according to the subframe configuration information, at least one of: transmit the common control information to the terminal over the first subframe, and transmit the dedicated control information to the terminal over the second subframe; and transmit subframe information to the terminal through a high layer signaling or a system broadcast message, wherein the subframe information is used for indicating the first subframe or the second subframe, transmit indication information to the terminal, transmit priority information to the terminal, wherein the priority information indicates a relationship between a priority of the common control information and a priority of the dedicated control information, so that the terminal:

determines the second subframe according to the indication information and the first subframe indicated by the subframe information or determines the first subframe according to the indication information and the second subframe indicated by the subframe information, determines that an overlapped subframe is the first subframe or the second subframe according to the subframe information and the priority information, and determines the subframe configuration information according to the first subframe and the second subframe.

6. The base station according to claim 5, wherein, the second subframe for transmitting the dedicated control information indicated by the subframe configuration information acquired by the processor comprises at least one of:

a third subframe for transmitting the dedicated control information of the terminal; and a fourth subframe for transmitting control information of a group to which the terminal belongs; wherein the third subframe is not overlapped with the fourth subframe;

the transmitter is specifically configured to perform at least one of:

transmit to the terminal the dedicated control information of the terminal over the third subframe; and transmit to the terminal the control information of the group to which the terminal belongs over the fourth subframe.

7. A terminal, comprising:

a receiver, configured to, receive subframe information of the terminal transmitted by a base station through a high layer signaling or a system broadcast message, wherein the subframe information is used for indicating a first subframe for transmitting common control information or a second subframe for transmitting dedicated control information, and the first subframe overlaps with the second subframe, receive indication information, and receive priority information, wherein the priority information indicates a relationship between a priority of the common control information and a priority of the dedicated control information;

a processor and a computer readable storage having computer instructions stored therein, the processor, when executing the instructions, is configured to determine the second subframe according to the indication information and the first subframe indicated by the subframe information or determines the first subframe according to the indication information and the second subframe indicated by the subframe information, determines that an overlapped subframe is the first subframe or the second subframe according to the subframe information and the priority information; and determine subframe configuration information according to the first subframe and the second subframe, wherein the subframe configuration information is used for indicating the first subframe and the second subframe; and the receiver further configured to at least one of: blindly detect and receive the common control information transmitted by a base station over the first subframe, and blindly detect and receive the dedicated control information transmitted by the base station over the second subframe, according to the subframe configuration information.

8. The terminal according to claim 7, wherein,
the second subframe for transmitting the dedicated control information indicated by the subframe configuration information acquired by the processor comprises:
a third subframe for transmitting the dedicated control information of the terminal; and/or
a fourth subframe for transmitting control information of a group to which the terminal belongs; wherein the third subframe is not overlapped with the fourth subframe;
the receiver is specifically configured to:
at least one of: blindly detect and receive dedicated control information of the terminal transmitted by the base station over the third subframe; and blindly detect and receive control information of a group to which the terminal belongs transmitted by the base station over the fourth subframe.

* * * * *